(No Model.)
2 Sheets—Sheet 1.
O. M. GORDER.
PLOW LAY HOLDER.
No. 582,281.
Patented May 11, 1897.
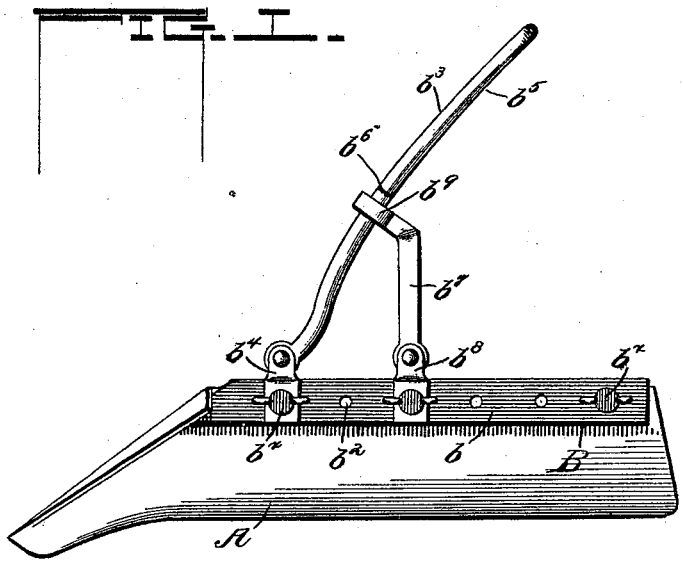
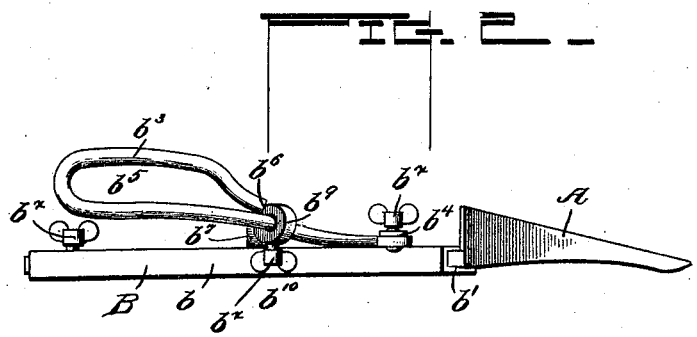
WITNESSES
Milton O'Connell,
L. W. Sirckbridge
INVENTOR
Olaf M. Gorder,
by John Wedderburn
Attorney (No Model.) 2 Sheets—Sheet 2.
O. M. GORDER.
PLOW LAY HOLDER.
No. 582,281. Patented May 11, 1897.
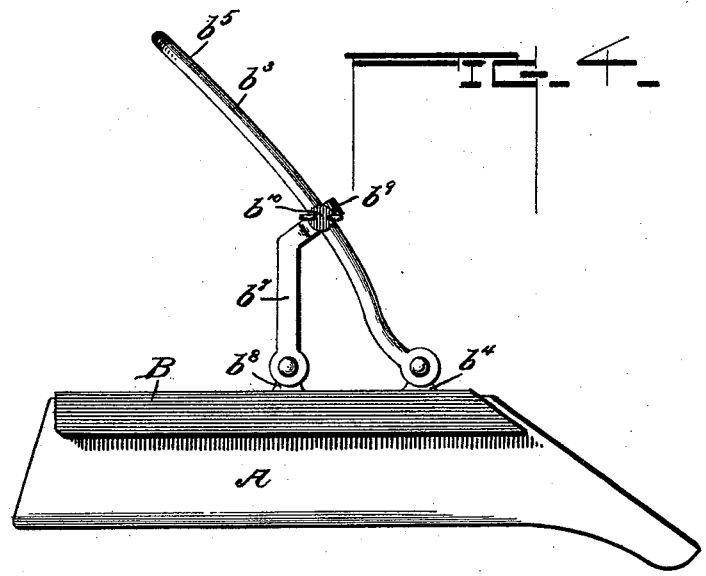
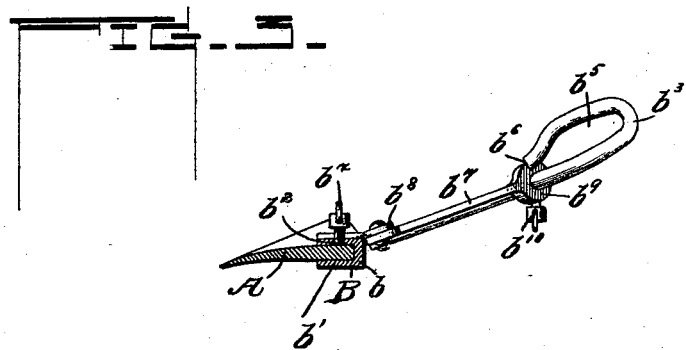
WITNESSES
Milton O'Connell,
L. W. Stockbridge.
INVENTOR,
Olaf M. Gorder,
by John Wedderburn
Attorney

UNITED STATES PATENT OFFICE.

OLAF MARIUS GORDER, OF CANBY, MINNESOTA.

PLOW-LAY HOLDER.

SPECIFICATION forming part of Letters Patent No. 582,281, dated May 11, 1897.

Application filed November 6, 1896. Serial No. 611,287. (No model.)

*To all whom it may concern:*

Be it known that I, OLAF MARIUS GORDER, a citizen of the United States, residing at Canby, in the county of Yellow Medicine and State of Minnesota, have invented certain new and useful Improvements in Plow-Lay Holders; and I do hereby declare the following to be a full, clear, and exact description of the invention, such as will enable others skilled in the art to which it appertains to make and use the same.

This invention relates to improvements in holding devices, and has more particular relation to devices for holding the lays or cutting-blades of plows while being heated and worked.

The invention consists of the combination, with a grooved holder adapted to receive the rear edge of the lay, of a handle pivoted to said holder, and a connecting-bar also pivoted to said holder and having one end adjustably connected to said handle.

The invention also consists of certain other novel constructions, combinations, and arrangements of parts, all of which will hereinafter be more fully described and claimed.

In the accompanying drawings, forming part of this specification, Figure 1 represents a top plan view of my improved holder with a plow-lay secured therein. Fig. 2 represents a rear elevation of the same, and Fig. 3 represents a transverse vertical section through said holder and lay. Fig. 4 represents a bottom plan view.

A in the drawings represents the plow-lay, and B my improved holder. The latter comprises a holder proper, $b$, provided with a groove $b'$ and formed with a plurality of screw-threaded apertures $b^2$. The said lay A is adapted to be secured within this groove $b'$ by means of set-screws $b^\times$, passed through any of the apertures $b^2$ and engaging the upper side of said lay. An operating-handle $b^3$ is pivoted at one end to an apertured lug $b^4$, mounted upon the holder B. This handle is provided at its outer end with a loop $b^5$, the inner end of which, $b^6$, forms a stop-shoulder. A guiding or adjusting link $b^7$ is pivotally connected to an apertured stud $b^8$, mounted upon the holder $b$, and the outer end of said link $b^7$ is formed with an eye $b^9$, that embraces the said handle $b^3$, so as to slide thereon and hold said handle in any desired adjusted position. This eye $b^9$ is held in the desired position upon the handle $b^3$ by a thumb-screw $b^{10}$, passing through said eye and adapted to engage said handle.

It will be observed from the foregoing description that when a plow-lay is to be worked it is inserted into the groove $b'$ and clamped therein by means of the set-screws $b^\times$. The handle $b^3$ is then adjusted to the desired position, according to the nature of the work to be done upon the lay, by means of the eye $b^9$ and thumb-screw $b^{10}$. It will also be observed that the link $b^7$ accomplishes a double purpose—acting as a base to the handle $b^3$ as well as an adjusting-guide for the same. If so desired, the thumb-screw $b^{10}$ may be left loose and the handle $b^3$ worked back and forth to any desired position during the progress of the work.

A great deal of trouble has been occasioned heretofore in the sharpening or working of plow-lays by the same getting out of shape while being hammered or operated upon. This is altogether obviated by the use of my invention, as the lay when it is clamped in my improved holder cannot bend either one way or the other, and may be worked to any desired degree and then removed in the same condition in which it was inserted. In use the handle $b^3$ is grasped at all times and thus fully supports and moves the heated plow-lay while it is being worked upon the anvil.

I provide the holder proper, $b$, with a plurality of screw-threaded apertures $b^2$, so that different-sized plow-lays may be clamped therein by inserting the set-screws through the proper apertures.

By the use of my invention a great saving in time, labor, and fuel is accomplished, as the holder is applied to the lay before the same is heated, and is ready to be grasped to remove the lay from the forge when the said lay is thoroughly heated without any further adjustment. It is always firmly attached to the lay, and there can be no slipping or turning of the latter, as is the case when handled by ordinary tongs.

I have shown the operating-handle in the drawings as being round and passing through a circular eye upon the connecting-rod, but I also contemplate making said handle square in cross-section and passing it through a square eye upon the connecting-rod.

Having thus described my invention, what I claim as new, and desire to secure by Letters Patent, is—

1. The combination with a grooved holder adapted to receive a plow-lay, a handle pivoted to the same, and a connecting-rod also pivoted to said holder, and having an adjustable connection with said handle, substantially as described.

2. The combination with a grooved holder adapted to receive a plow-lay, set-screws mounted in said holder for securing the lay in said groove, a handle pivoted to said holder, and a connecting-rod also pivoted to said holder and provided with an eye through which a handle passes, and an adjusting-screw adapted to bind said eye and said handle together, substantially as described.

3. The combination with a holder having a groove for receiving a plow-lay, set-screws for securing the lay in said groove, a handle pivoted to said holder and provided with a looped outer end forming a stop, a connecting-rod also pivoted to said holder and provided at one end with an eye adapted to embrace said handle, and a thumb-screw passing through said eye for securing the same adjustably to the handle, substantially as described.

In testimony whereof I have signed this specification in the presence of two subscribing witnesses.

OLAF MARIUS GORDER.

Witnesses:
L. M. LERWICK,
H. E. SEVENSON.